(12) United States Patent
Bartel et al.

(10) Patent No.: US 8,214,821 B1
(45) Date of Patent: *Jul. 3, 2012

(54) METHOD AND SYSTEM FOR AUTOMATIC FIRMWARE UPDATES IN A PORTABLE HAND-HELD DEVICE

(75) Inventors: Mark Allen Bartel, Federal Way, WA (US); Craig Skinner, Snohomish, WA (US); Ken Johnson, Renton, WA (US); Katherine Elliot, Seattle, WA (US)

(73) Assignee: Access Co., Ltd., Tokyo (JP)

( * ) Notice: Subject to any disclaimer, the term of this patent is extended or adjusted under 35 U.S.C. 154(b) by 1270 days.

This patent is subject to a terminal disclaimer.

(21) Appl. No.: 10/871,085

(22) Filed: Jun. 18, 2004

Related U.S. Application Data

(63) Continuation of application No. 09/843,797, filed on Apr. 26, 2001, now Pat. No. 6,754,895.

(51) Int. Cl.
*G06F 9/44* (2006.01)
(52) U.S. Cl. ........ 717/168; 717/171; 717/172; 717/173; 717/169
(58) Field of Classification Search .................. 717/173, 717/171, 172, 168, 169
See application file for complete search history.

(56) References Cited

U.S. PATENT DOCUMENTS

| | | | |
|---|---|---|---|
| 5,689,825 A * | 11/1997 | Averbuch et al. | 455/418 |
| 5,794,054 A * | 8/1998 | Le et al. | 710/240 |
| 5,848,064 A * | 12/1998 | Cowan | 370/338 |
| 5,901,225 A * | 5/1999 | Ireton et al. | 714/6.32 |
| 6,170,060 B1 * | 1/2001 | Mott et al. | 726/29 |
| 6,198,946 B1 * | 3/2001 | Shin et al. | 455/561 |
| 6,247,168 B1 * | 6/2001 | Green | 717/176 |
| 6,360,362 B1 * | 3/2002 | Fichtner et al. | 717/168 |
| 6,496,979 B1 * | 12/2002 | Chen et al. | 717/178 |
| 6,545,978 B1 * | 4/2003 | Sakurai | 370/236.2 |
| 6,581,157 B1 * | 6/2003 | Chiles et al. | 713/1 |
| 6,668,374 B1 * | 12/2003 | Sten et al. | 717/173 |
| 6,728,956 B2 * | 4/2004 | Ono | 717/168 |
| 6,944,854 B2 * | 9/2005 | Kehne et al. | 717/168 |
| 6,976,163 B1 * | 12/2005 | Hind et al. | 713/156 |
| 7,082,549 B2 * | 7/2006 | Rao et al. | 714/6 |

FOREIGN PATENT DOCUMENTS

KR 2001-0100328 * 11/2001

OTHER PUBLICATIONS

Brown et al., "Remote Service Methods for Cellular Communication Systems", 1995.*
Jubin et al., "The DARPA Packet Radio Network Protocols", 1987.*

* cited by examiner

*Primary Examiner* — Phillip Nguyen
(74) *Attorney, Agent, or Firm* — Berry & Associates P.C.

(57) ABSTRACT

A method for automatically updating firmware of a hand-held device. To initiate the automatic update, a reset of the hand-held device is detected and an update application is executed. The update application determines whether a flag, indicating a pervious execution of the update application, has been set. If the flag is set, the update application terminates, otherwise, the update application performs an identification test by determining whether a device ID of the device matches a device ID stored in a table of the update application. If the device ID does not match, the update application terminates and the flag is set. If the device ID matches, the update application updates the firmware of the hand-held device, sets the flag, and terminates. In so doing, the firmware of the hand-held device is updated without requiring user intervention or interaction.

18 Claims, 6 Drawing Sheets

METHOD AND SYSTEM FOR AUTOMATIC FIRMWARE UPDATES IN A PORTABLE HAND-HELD DEVICE

This application is a continuation of and claims the benefit of application Ser. No. 09/843,797 filed on Apr. 26, 2001 now U.S. Pat. No. 6,754,895

TECHNICAL FIELD

The present invention relates to a system and method by which control information for a personal information device ("PID") may be more easily updated. In particular, the present invention relates to a system and method for reliably updating the firmware of the PID in a manner transparent to the user.

BACKGROUND ART

Personal Information Devices include the class of computers, personal digital assistants and electronic organizers that tend both to be physically smaller than conventional computers and to have more limited hardware and data processing capabilities. PIDs include, for example, products sold by Palm, Inc. of Santa Clara, Calif., under such trademark as Pilot, and Pilot 1000, Pilot 5000, PalmPilot, PalmPilot Personal, PalmPilot Professional, Palm, and Palm III, Palm V, Palm VII, m100, m505, as well as other products sold under such trade names as WorkPad, Franklin Quest, and Franklin Convey.

PIDs are generally discussed, for example, in U.S. Pat. Nos. 5,125,039; 5,727,202; 5,832,489; 5,884,323; 5,889,888; 5,900,875; 6,000,000; 6,006,274; and 6,034,686, which are incorporated herein by reference. PIDs typically include a screen and data processor, allowing the PID user to operate a substantial variety of applications relating to, for example: electronic mail, a calendar, appointments, contact data (such as address and telephone numbers), notebook records, a calendar, expense reports, "to do lists" or games. PIDs also often include substantial electronic memory for storing such applications as well as data entered by the user. Due to their substantial variety of applications and uses, personal information devices are becoming increasingly widely used.

One increasingly popular application of personal information devices is their ability to share information with other properly equipped personal information devices, wirelessly and otherwise. For example, many types of user information such as electronic mail, calendar events, appointments, contact data, and the like exist in the form of digital data files stored within the memory of the personal information device. When equipped with communications hardware/software, the data files embodying the user information can be easily transferred from one personal information device to another. For example, one such application involves the transferring of electronic "business cards" from one personal information device to another, allowing their respective users to easily exchange contact information.

Much of the functionality of the PID is software based, in that software based routines are executed by the computer processor of the PID to perform the various functions of the applications. For example, the transmission and reception of electronic mail, calendar events, appointments, contact data, and the like relies upon the execution of software applications, a portion of which are firmware based. The firmware based functions tends to be relatively fixed, in that they tend to provide the basic building blocks for other software applications to utilize in implementing their functionality. Firmware is typically loaded and configured in the PID at the time of its manufacture, and is not normally configured or updated by the user.

There is a problem however, in that at times it may be advantageous to update the firmware of the PID. For example, there may be occasions where devices exit fabrication with inadvertently built-in faults or defects. One solution would be to have the user "mail in" the device to the factory to have a factory technician correct defects/faults. The obvious drawback to this solution is that it requires the user give up the use of the device for a period of time, often several weeks or more, and ties of valuable factory personnel manually updating a possibly large number of devices.

Another solution would be to "patch" the firmware for the device with a custom-designed software routine that works around the defect/fault. For example, in a case where a number of devices have been inadvertently programmed with incorrect performance parameters (e.g., wrong configuration information for their wireless transceiver, incorrect error checking codes, or the like), a patch can be distributed to the users, wherein the users load the patch onto their devices, run the patch, and thereby update their firmware with the correct performance parameters. This solution has a number of drawbacks. For example, the manually executed patch requires the intervention of the user, where the user must locate the correct patch, load the correct patch, and properly execute it. There may be occasions where different devices require different patches. On such an occasion, the user must identify his device (e.g., by serial No.), based upon this identity, obtain the correct patch (e.g., via the Internet), and properly execute the patch and verify its success. Thus, there are numerous sources of potential error. Additionally, the widespread distribution of firmware patch routines presents obvious device vulnerabilities (e.g., potential viruses, firmware hacks, malicious exploits, and the like).

Thus, what is required is a solution that allows the automatic firmware updates of portable hand-held devices. The required solution should be robust and relatively immune to user error or confusion. In addition, what is required is a solution that permits the efficient targeted update of particular devices out of an entire number of devices that may have been fabricated. The required solution should be efficiently implemented as to not impose an undue processing burden on the devices. The required solution should function in a manner transparent to user. The present invention provides a novel solution to the above requirements.

SUMMARY OF THE INVENTION

The present invention provides a solution that allows the automatic firmware updates of portable hand-held devices. The present invention is robust and relatively immune to user error or confusion. In addition, the present invention permits the efficient targeted update of particular devices out of an entire number of devices that may have been fabricated. The present invention is efficiently implemented and does not impose an undue processing burden on the devices. The present invention functions in a manner transparent to the user.

In one embodiment, the present invention is implemented as a software based update application for automatically updating firmware of a hand-held device. To initiate the automatic update, a reset of the hand-held device is detected. Once a reset is detected, an update application is executed, wherein the update application performs the required updating steps. The execution of the update application is hidden, such that the update application executes transparently to the user. The update application determines whether a flag has been set in a nonvolatile memory area of the hand-held device. The flag is used to indicate a previous execution of the update application. If the flag is set, the update application terminates. If the flag is not set, the update application determines whether a device ID (e.g., serial No.) of the device matches a device ID stored in a table of the update application. If the device ID of the hand-held device does not match the device ID stored in the table, the update application terminates and the flag is set. If the device ID of the hand-held device matches the device ID stored in the table, the update application updates the firmware of the hand-held device, sets the flag, and terminates.

In so doing, the firmware of the hand-held device can be updated without requiring user intervention or interaction. The update application can be distributed to the hand-held device from a centralized server via the Internet. Alternatively, the update application can be distributed to the hand-held device wirelessly from another hand-held device. To assist the device manufacturer, the update application can be configured to transmit status information from the hand-held device to a centralized server regarding the execution of the update application via the Internet. This can be done, for example, when the device connects to the Internet to synchronize user information (calendars, e-mail, etc.).

The update application can be distributed to devices as a hidden application within new ROM or firmware update releases that are provided to a user, for example, as part of an upgrade. Consequently, the update application can update the firmware without any knowledge or intervention by the user.

By executing transparently upon a device reset, the update application is robust and relatively immune to user error or confusion. By matching serial numbers, the update application enables the efficient targeted update of particular devices out of an entire number of devices that may have been fabricated. Thus, specific faults with specific batches of hand-held devices can be corrected. By checking flags prior to running its execution, the update application does not impose an undue processing burden on the devices.

BRIEF DESCRIPTION OF THE DRAWINGS

The present invention is illustrated by way of example and not by way of limitation in the Figures of the accompanying drawings, in which like reference numerals refer to similar elements, and in which.

DETAILED DESCRIPTION OF THE INVENTION

Figure 1:
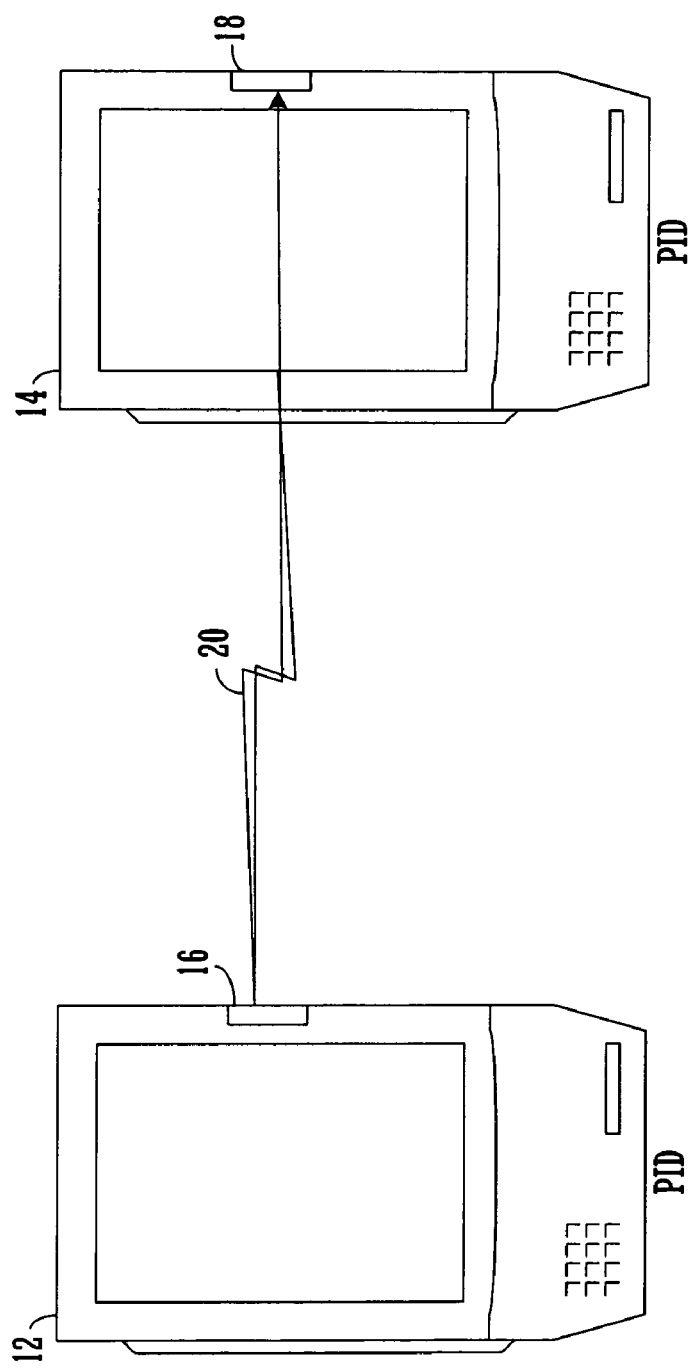
FIG. 1 shows an exemplary embodiment of a system in accordance with one embodiment of present invention.

In the following detailed description of the present invention, a method and system for implementing wireless data transfers between a selected group of mobile computing devices, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to obscure aspects of the present invention unnecessarily.

Some portions of the detailed descriptions which follow are presented in terms of procedures, logic blocks, processing, and other symbolic representations of operations on data bits within a computer memory. These descriptions and representations are the means used by those skilled in the data processing arts to convey most effectively the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "emulating" or "implementing," "transferring," "executing," "arbitrating," "configuring," "bursting," "initializing," or the like, refer to the actions and processes of an embedded computer system, or similar embedded electronic computing device, that manipulates and transforms data represented as physical (electronic) quantities within the computer system's registers and memories into other data similarly represented as physical quantities within the computer system memories or registers or other such information storage, transmission or display devices.

The present invention is directed towards a software based update application for automatically updating firmware of a hand-held device. The present invention is robust and relatively immune to user error or confusion. In addition, the present invention permits the efficient targeted update of particular devices out of an entire number of devices that may have been fabricated. The present invention is efficiently implemented and not impose an undue processing burden on the devices. The present invention functions in a manner transparent to user. Embodiments of the present invention and its benefits are further described below.

Embodiments of the present intention are described in the context of a PID (personal information device). However, it should be noted that the method and system of the present invention can be configured to enable automatic firmware updates for a number of different types of mobile computing devices. Such mobile computing devices include, for example, hand-held cellular telephones (cell phones), pagers, digital cameras, and other types of mobile telephones, alphanumeric paging devices, and the like.

FIG. 1 shows an exemplary embodiment of a system in accordance with one embodiment of present invention. FIG. 1 shows a hand-held PID 12 and a PID 14. In this embodiment, an update application is transferred from a first PID 12 to a second PID 14 in order to implement the automatic firmware updates. As depicted in FIG. 1, the PID 12 is communicatively coupled to a second PID 14. PID 12 includes a wireless port, or transceiver, 16 (used herein to mean some combination of a receiver and/or transmitter). The PID 14 has a corresponding wireless port, or transceiver, 18 such that a wireless link 20 is established between the PID of 14 and PID 12.

In one embodiment, the wireless ports 16, 18 each include a short-range radio frequency (RF) transceiver. The wireless transceivers 16-18 establish an RF link, such as that defined by the Bluetooth communications specification. Additionally, the link 20 can also include support for other modes of communication, including an infrared communication links such as that as defined by the Infrared Data Association (IrDA).

Figure 2:
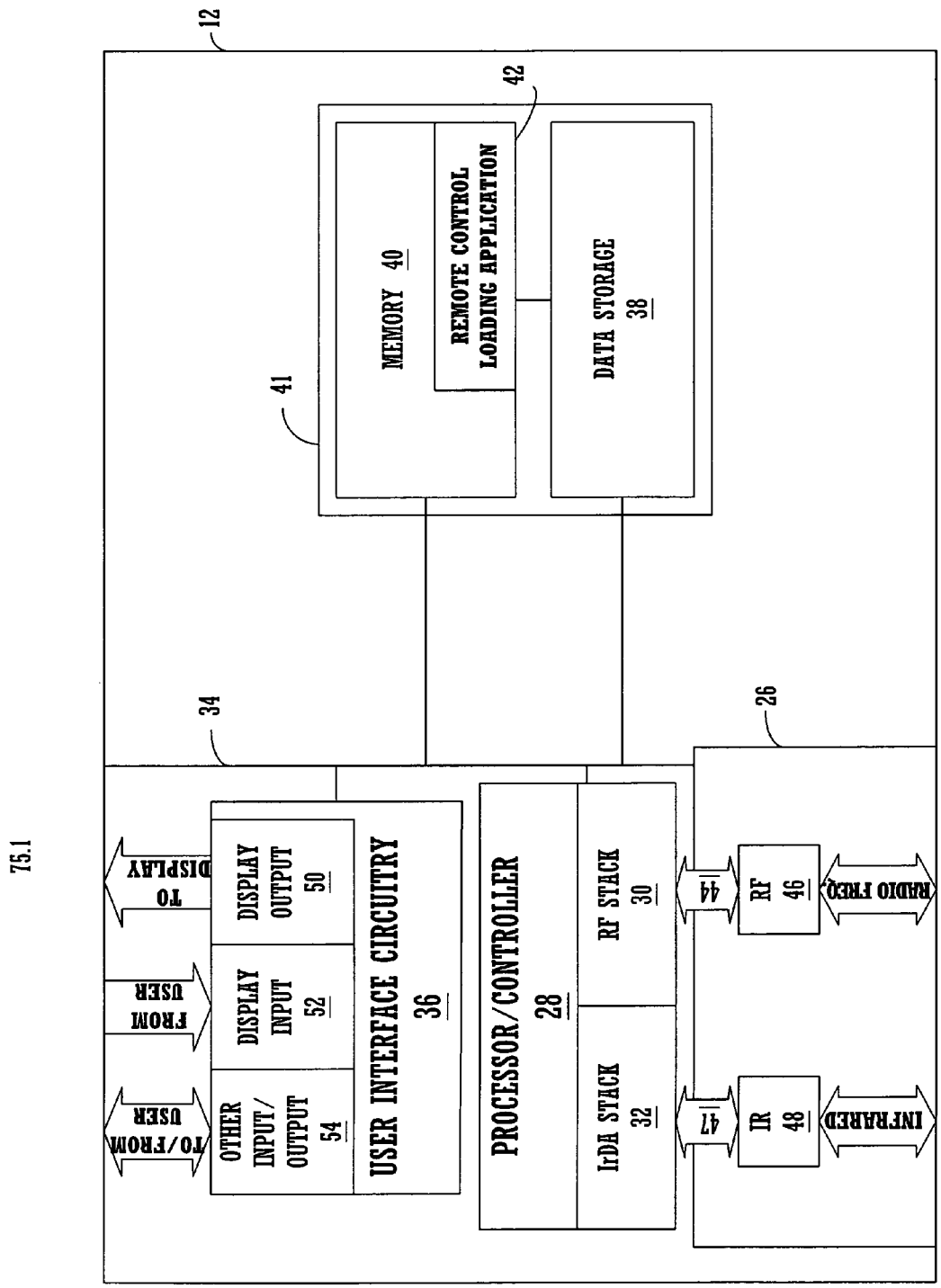
FIG. 2 shows a function block diagram showing an exemplary embodiment of the PID that can communicate with a second PID, or other such device, and transfer an update application in accordance with the present invention.

FIG. 2 is a function block diagram showing an exemplary embodiment of the PID 12 that can communicate with the PID 14, or other such devices, and transfer an update application in accordance with the present invention. The link interface circuitry 26 illustrates, but is not limited to, two alternative link interfaces for establishing a wireless link to another device. One wireless link interface (or more than two link interfaces) may, of course, be used.

The PID 12 includes a processor, or controller, 28 that is capable of executing an RF stack 30 and an IrDA stack 32. The stack 30, 32 communicate with data interface circuitry 26 through a bus 34. The processor 28 is also connected through the bus 34 to user interface circuitry 36, a data storage module 38 and memory 40. As used herein, the data storage module 38 and memory 40 may both generally be referred to as part of the PID memory 41.

The memory 40 may contain a specific remote control loading application 42. The remote control loading application 42 may operate, for example, after the processor 28 receives a message for the user to establish a wireless link with the PID 14 in the nearby environment. Alternatively, the remote control loading application 42 may operate in a PID default mode.

The data interface circuitry 26 includes, in this exemplary embodiment, a first and second port, such as, infrared and RF interface ports. The first wireless link interface, the RF link interface, may include first connection 44 which includes radio-frequency (RF) circuitry 46 for converting signals into radio-frequency output and for accepting radio-frequency input. The RF circuitry 46 can send and receive RF data communications via a transceiver that are part of the communication port 16. The RF communication signals received by the RF circuitry 46 are converted to electrical signals and relayed to the RF stack 30 in processor 28 via the bus 34.

The PID 14 includes a corresponding port, or transceiver, 18 for RF signals. Thus, the wireless link 20 between the PID 12 and PID 14 may be implemented according to the Bluetooth specification, described at www.bluetooth.com, which is incorporated in its entirety into this document.

Generally, Bluetooth is a short-range radio link intended to replace the cable(s) connecting portable and/or fixed electronic devices. Bluetooth technology features low power, robustness, low complexity and low cost. It operates in the 2.4 Ghz unlicensed ISM (Industrial, Scientific and Medical) band. Devices equipped with Bluetooth are capable of exchanging data at speeds up to 720 kbps at ranges up to 10 meters. It should be noted that higher power devices other than the typical Bluetooth enabled PID, such as, for example, a network access point, may communicate via Bluetooth with an RF-enabled PID over a greater range, such as, for example, approximately 100 meters.

As noted above, PID 12 and PID 14 may operate with only one wireless link. However, additional, or alternative, wireless link interfaces may also be included. A second connection 47 includes infrared circuitry 48 for converting signals into infrared output and for accepting infrared input. Thus, the wireless link 20 may include an infrared interface. The infrared circuitry 48 can send and receive infrared data communications via the port, or transceiver, 16.

Infrared communication signals received by infrared circuitry 48 are converted into electrical signals that are relayed to the IrDA stack 32 in the processor, or controller, 28 via the bus 34. The PID 14 may include a corresponding infrared transceiver. The infrared circuitry 48 operates according to the IrDA specifications available at www.IrDA.org.

The two, alternative link interfaces described above are merely exemplary, and additional means for implementing the interface between multiple PIDs, telephones, or other such devices may also be utilized. Although not required, more than one wireless link interface may be included to improve flexibility and to provide redundancy in case of failure of one of the link interfaces. Similarly, wired link interfaces can also be included in conjunction with, or in place of, the one or more wireless interfaces (e.g., a "hot-synch" in a cradle interface where data is downloaded to a desktop computer system then to the PID via RS232, USB, or similar wired link interfaces).

Referring still to FIG. 2, user interface circuitry 36 in the PID 12 includes hardware and software components that provide user input and output resources for functions in the processor 28. The user interface circuitry 36 includes display output 50, display input 52, and additional input/output interface circuitry 54.

The display output 50 receives digital information representing graphical data from the processor 28 and converts the information to a graphical display, such as text and or/images, for display on a display screen. The display input 52 may receive data inputs, such as graphical data inputs, from a user of the PID 12. The graphical data inputs are preferably entered by the user with a stylus on a pressure sensitive display screen, and may include text, drawings, or other objects that are capable of being graphically presented.

Typically, the additional input/output interface 54 permits user input and commands to be input through buttons and similar devices on the PID, e.g., buttons for scrolling through data entries and activating applications. A removable keyboard (e.g., a small portable keyboard accessory) may also be used. Alternatively, the input/output interface 54 may allow the PID 12 to accept audio data as well as other types of non-graphical data. For example, audio data signals (or picture telephone video input) may be entered through the additional input/output interface 54.

Figure 3:
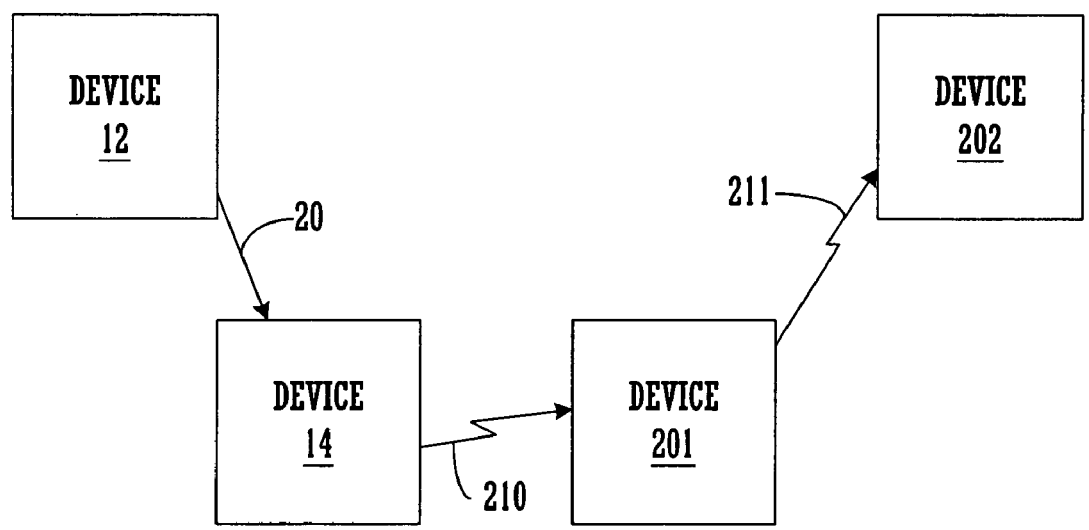
FIG. 3 shows a diagram of a PID transferring an update application in accordance with the present invention to multiple hand-held devices.

FIG. 3 shows a diagram of PID 12 transferring an update application in accordance with the present invention to multiple hand-held devices, PID 14, PID 201, and PID 202. The link 20 is establish between PID 12 and PID 14 in the manner described above. This link is used to pass the update application from PID 12 to PID 14. The transfer of the update application can be done transparently to the user. Alternatively, a confirmation dialogue can be presented on a display of PID 14 informing the user that a firm were update is available and asking the user to OK its reception. Once the update application is received by PID 14, the same process can be followed with devices 201-202. For example, PID 14 can initiated link 210 with PID 201 in order to exchange calendar information. During the link, PID 14 can inform PID 201 data the update application is available. Similarly, PID 201 in turn passes the update application to PID 202 via link 211.

Figure 4:
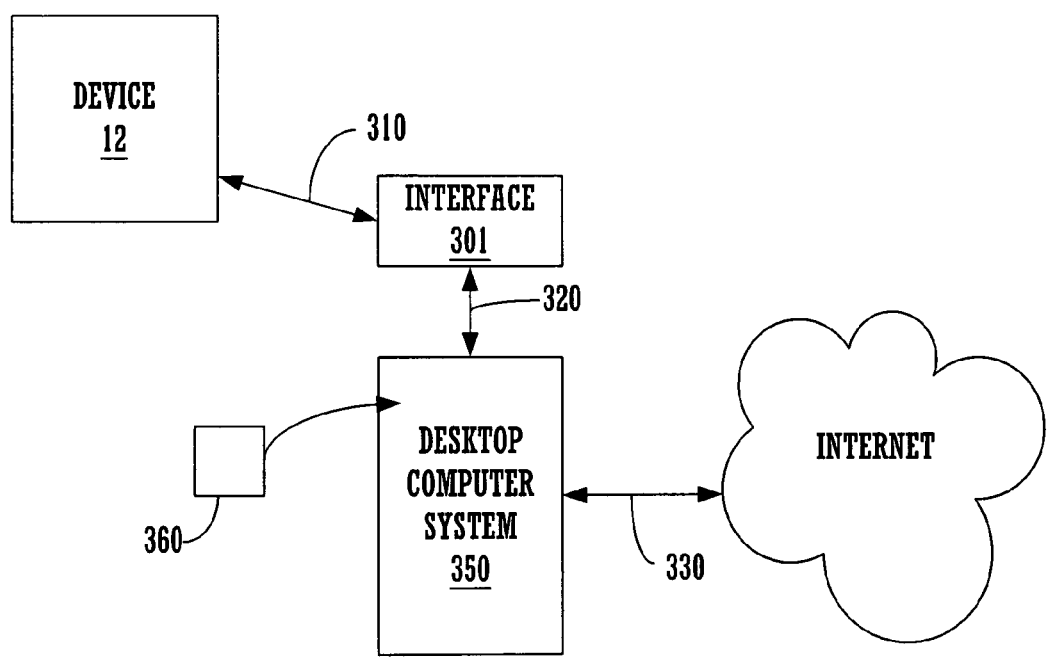
FIG. 4 shows a diagram of a PID receiving and update application in accordance with the present invention from a docking interface of a desktop computer system.

FIG. 4 shows a diagram of PID 12 receiving an update application in accordance with the present invention from a docking interface 301 of a desktop computer system 350. Generally, PID 12 receives new applications, new information, and the like via a synchronization process with computer system 350 via the interface 301. Interface 301 is usually implemented as a "docking cradle" in which PID is placed in order to exchange information with the desktop computer system 350. The interface 301 implements a communications link 310 with the PID 12. Interface 301 is connected to the computer system 350 via a communications link 320. As depicted in FIG. 4, the desktop computer system 350 is connected to the Internet via a connection 330 (e.g., dial-up modem, DSL, LAN, etc.), and provides Internet communication for PID 12. Thus, PID 12 can receive the update application from, for example, the device manufacturer's centralized server or web site on the Internet. FIG. 4 also shows a computer readable media 360, for example, a floppy disk or a CD-ROM, through which PID 12 can also receive the update application. For example, the computer readable media 360 is inserted into the desktop computer system 350 where the information is retrieved and is made accessible to PID 12 via interface 301 and communications link 310 and 320.

Figure 5:
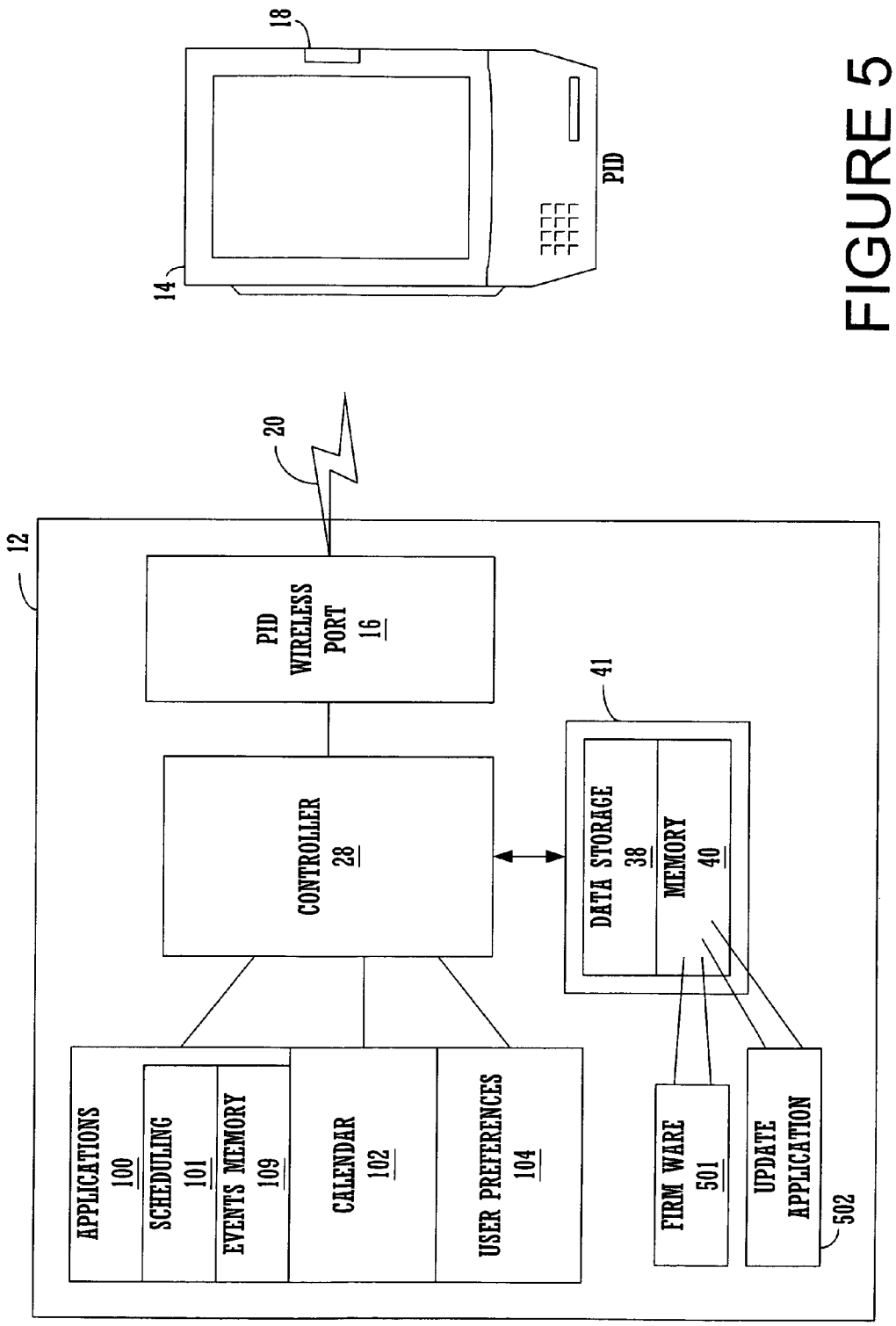
FIG. 5 shows a diagram of the software applications in accordance with one embodiment of the present invention executed on a PID.

FIG. 5 shows a diagram of the software applications executed on PID 12. As depicted in FIG. 5, the PID 12 may include resident applications 100, such as, for example, a scheduling program 101 for managing schedule information. The PID 12 may include as well, for example, events management program 109 for recording the start time and stop time of special events, a calendar program 102 for assisting in managing scheduling and events, and a user preferences program 104 for configuring PID 12 in accordance with the requirements of the user.

Generally, resident applications 100 utilize services provided by firmware based applications executing on PID 12. For example, the transmission and reception of electronic mail, calendar events, appointments, contact data, and the like by applications 100 relies upon the execution of firmware based functions. The firmware based functions tend to be relatively fixed, and typically provide the basic building blocks for other software applications to utilize implementing their functionality. Such functions include, for example, basic input and output between the user interface and applications 100, operating system services, file system services, radio functionality, and the like. The firmware of PID 12 is depicted as firmware 501. Firmware is typically loaded and configured in the PID at the time of its manufacture, and is not usually configured or updated by the user.

Figure 6:
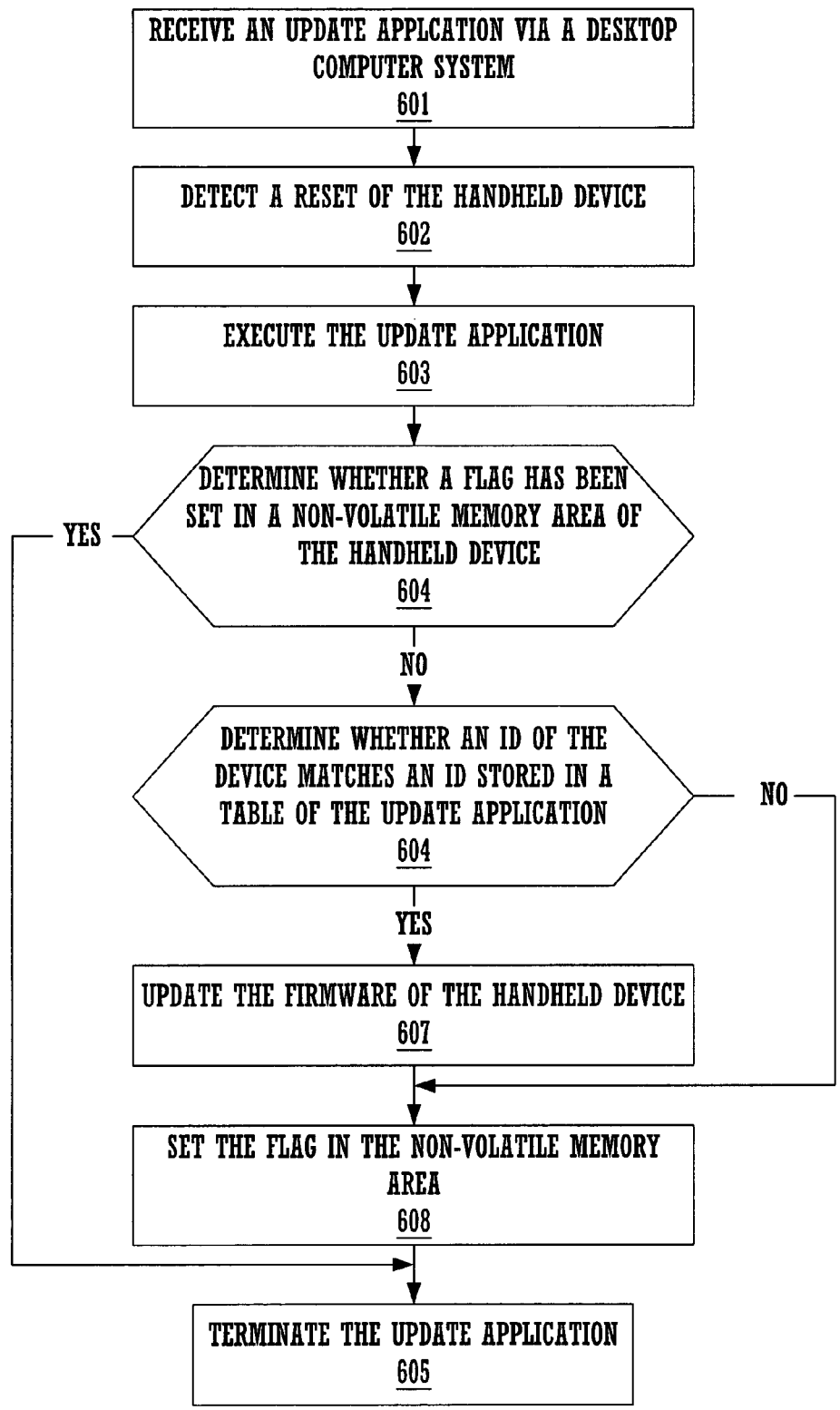
FIG. 6 shows a flow chart of the steps of an automatic firmware update process for a hand-held computing device in accordance with one embodiment of the present invention.

Referring now to FIG. 6, a flow chart of the steps of an automatic firmware update process 600 for a hand-held computing device (e.g., PID 12) is shown. FIG. 6 depicts the operating steps performed as the update application is received from a desktop computer system and is executed to update the firmware of the hand-held device.

Process 600 begins in step 601, where an update application is received by the hand-held device (e.g., PID 12) via a desktop computer system (e.g., computer system 350 of FIG. 4). As described above, the update application can be distributed to hand-held devices via a number of different mechanisms. In this example, the desktop computer system retrieves the update application via an Internet connection (e.g., Internet connection 330). Subsequently, the update application is received by PID 12 during a synchronization process with desktop computer system 350. In step 602, a reset of PID 12 is detected by the update application. In step 603, upon detection of the reset, the update application begins executing. As described above, the update application automatically executes upon a reset of PID 12. No interaction or intervention by the user is required. The execution of the update application remains hidden, and takes place transparently with respect to the user interface of PID 12.

In step 604, the update application determines whether a flag has been set in a nonvolatile memory area of PID 12. The flag indicates a previous running of the update application. In step 604, if the update application detects the flag as having been set, process 600 proceeds to step 605, where the execution of the update application terminates. The use of the flag mechanisms saves processor cycles. Upon being initiated, the update application immediately checks for the presence of the flag having been set. This avoids wasting time executing the majority of the update application every time PID 12 is reset. In an alternate embodiment, the update application can be configured to uninstall itself depending upon the condition of the flag.

In step 606, where the flag has not been set as determined in step 604, the update application determines whether a device ID (e.g., device serial No.) of PID 12 matches a device ID stored in a table data structure of the update application. This table identifies which particular devices, for example, out of an entire year's worth of produced devices, requires the specific firmware update. The table allows a very targeted update out of the number devices which may be distributed to the public. For example, only those particular devices having a specific type fault can be targeted for the firmware update. Or, for example, a different type of update can be provided to particular devices as determined by their device ID. The table also allows potentially time consuming operations (e.g., mathmatical parameter computations based on parameter variables stored on the individual devices) to be performed off-line. If the device ID does not match a corresponding device ID stored in the table data structure, process 600 proceeds to step 608. If the device ID does match, process 600 proceeds to step 607. It should be noted that other identification means can be utilized in place of a device ID. For example, the update application could check specific parameters within PID 12 and update based on those parameters, while still targeting a specific subset of devices. Similarly, other identification means can be utilized in place of a table. For example, calculated values based upon specific parameters within PID 12 can be used, while still performing an identification test.

In step 607, when the device ID matches, the firmware of the device is updated in accordance with computer readable instructions incorporated within the update application. For example, the update application may update parameters controlling the operation of the wireless transceiver of the PID.

In step 608, the flag is set in nonvolatile memory of PID 12. As described above, once the firmware has been updated, the flag is set such that upon subsequent resets of PID 12, the update application quickly terminates, thereby minimizing the number of wasted processor cycles. Additionally, where the device ID does not match the device ID stored in the table as determined in step 606, the flag is also set. Process 600 subsequently proceeds to step 605, where the update application terminates.

Thus, the present invention provides a software based update application for automatically updating firmware of a hand-held device. The present invention is robust and relatively immune to user error or confusion. In addition, the present invention permits the efficient targeted update of particular devices out of an entire number of devices that may have been fabricated. The present invention is efficiently implemented and not impose an undue processing burden on the devices. The present invention functions in a manner transparent to user.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. A method for automatically updating firmware of a user's hand-held device by an update application, the user's hand-held device comprises a user interface, the method comprising the steps of:
   executing, by a processor of the user's hand-held device, the update application;
   determining, by the update application, whether a flag has been set in the user's hand-held device, the flag indicating a previous execution of the update application;
   if the flag is not set, determining, by the update application, whether a device ID of the user's hand-held device matches a device ID stored in the update application;
   updating, by the update application, firmware of the user's hand-held device if the device ID matches the stored device ID and thereafter terminating the updating operation; and
   wherein the method of automatically updating the firmware is not viewable by a user that currently interacts with the user interface and does not require initiation or intervention by the user.

2. The method of claim 1, further including the step of downloading the update application from a server via the Internet.

3. The method of claim 1, further including the step of wirelessly receiving the update application from a second hand-held device.

4. The method of claim 1, further including the step of wirelessly receiving the update application from a removable computer readable memory.

5. The method of claim 1, further including the step of transmitting status information from the user's hand-held device to a server regarding the execution of the update application via an Internet.

6. The method of claim 1 wherein the device ID is a serial number of the user's hand-held device.

7. A non-transitory computer readable media having computer readable instructions for automatically updating firmware of a user's hand-held device by using an update application, the user hand-held device comprises a user interface, the computer readable instructions when executed by a computer system within the user's hand-held device cause the user's hand-held device to perform a method comprising:
   detecting a reset of the hand-held device; and
   if a reset is detected, executing the update application, wherein the update application performs
      determining whether a previous execution of the update application has occurred by using an indicator that has been set in the user's hand-held device, wherein the indicator indicating a previous execution of the update application;
      if a previous execution of the update application has not occurred, determining whether a device ID of the user's hand-held device matches a stored device ID;
      updating firmware of the user's hand-held device if the device ID of the user's hand-held device matches the stored device ID and thereafter terminating the updating operation; and
      wherein the method performed by the user's hand-held device is not viewable by a user that currently interacts with the user interface and do not require intervention by the user.

8. The non-transitory computer readable media of claim 7, wherein the user's hand-held device further performs the step of downloading the update application from an Internet.

9. The non-transitory computer readable media of claim 7, wherein the user's hand-held device wirelessly receives the update application from a second hand-held device.

10. The non-transitory computer readable media of claim 7, wherein the user's hand-held device transmits status information from the user's hand-held device to a server regarding the execution of the update application via an Internet.

11. The non-transitory computer readable media of claim 7, wherein the device ID is a serial number of the user's hand-held device.

12. A user's portable hand-held device configured for automatic firmware updates by an update application, comprising:
   a computer system having a processor coupled to a memory via a bus, the memory having computer readable instructions stored therein, which when executed by the processor of the computer system, cause the user's portable hand-held device, which comprises a user interface, to perform a method comprising:
   detecting a reset of the hand-held device; and
   if a reset is detected, executing the update application, wherein the update application performs:
      determining whether a previous execution of the update application has occurred by using an indicator that has been set in the user's hand-held device, wherein the indicator indicating a previous execution of the update application;
      if a previous execution of the update application has not occurred, determining whether a device ID of the user's portable hand-held device matches a stored device ID;
      updating firmware of the user's portable hand-held device if the device ID of the user's portable hand-held matches the stored device ID and thereafter terminating the updating operation; and
      wherein the method performed by the user's portable hand-held device is not viewable by a user that currently interacts with the user interface and does not require intervention by the user.

13. The user's portable hand-held device of claim 12, wherein the update application is downloaded from a server via an Internet.

14. The user's portable hand-held device of claim 12, wherein update application is received wirelessly from a second hand-held device.

15. The user's portable hand-held device of claim 12, wherein the user's portable hand-held device is further configured to transmit status information from the user's portable hand-held device to a server regarding the execution of the update application.

16. The hand-held device of claim 12 wherein the device ID is a serial number of the user's portable hand-held device.

17. A method of automatically updating firmware of a user's hand-held device by an update application, the user's hand-held device comprises a user interface, the method comprising:

detecting a reset of the user's hand-held device by a processor of the user's hand-held device; and once a reset is detected, executing the update application on the processor of the user's hand-held device, wherein the update application performs:

determining whether a previous update has occurred by using an indicator that has been set in the user's hand-held device, wherein the indicator indicating a previous execution of the update application;

if no previous update has occurred, determining whether a parameter of the user's hand-held device matches a predetermined range;

updating firmware of the hand-held device if the parameter of the user's hand-held device matches the predetermined range and thereafter terminating the updating operation; and wherein the method of automatically updating the firmware is not viewable by a user that currently interacts with the user interface and does not require intervention by the user.

18. A method for automatically updating firmware of a user's portable electronic device by an update application, which comprises a user interface, the method comprising:

executing, by a processor of the user's portable electronic device, the update application;

determining, by the update application, whether a flag as been set in the user's portable electronic device, the flag indicating a previous execution of the update application;

if the flag is not set, determining, by the update application, whether a device ID of the user's portable electronic device matches a device ID stored in the update application;

updating, by the update application, firmware of the user's portable electronic device if the device ID of user's portable electronic device matches the stored device ID and thereafter terminating the updating operation; and wherein the method of automatically updating the firmware is not viewable by a user that currently interacts with the user interface and does not require initiation or intervention by the user.

\* \* \* \* \*